Figure 1:
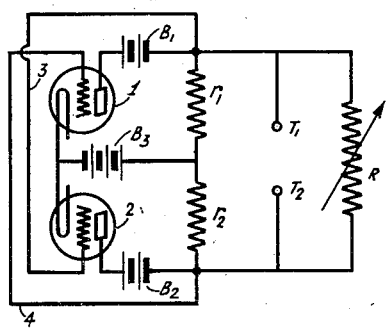

Aug. 28, 1934.  W. VAN B. ROBERTS  1,971,919
NEGATIVE CONDUCTANCE CIRCUITS
Filed Oct. 11, 1930

INVENTOR
WALTER VAN B. ROBERTS
BY
ATTORNEY

Patented Aug. 28, 1934

1,971,919

UNITED STATES PATENT OFFICE 1,971,919

NEGATIVE CONDUCTANCE CIRCUITS

Walter Van B. Roberts, Princeton, N. J., assignor to Radio Corporation of America, a corporation of Delaware Application October 11, 1930, Serial No. 488,147

4 Claims. (Cl. 178—44)

My present invention relates to circuits possessing negative resistance and more particularly to improved circuits for producing the effect of negative conductance characteristic.

The uses of a negative conductance are well known. In general, if any vibrating or rotating body produces a difference of potential between a pair of terminals due to its motion, the connection of a conducting body across such terminals will tend to diminish the motion of the body by absorbing energy therefrom in the form of electric current flowing through the conducting body. If, however, the conducting body has a negative conductance characteristic, the current flowing in response to motion of the moving body will be in the opposite direction to the voltage produced by the moving body, and, hence according to well known reciprocity theorems, the body will be accelerated, or maintained in its motion, rather than slowed down.

Thus, for purposes of illustration the following are typical: A tuned circuit with its terminals connected to a sufficiently large negative conductance will oscillate. Again, any kind of electric motor will run if its terminals are connected to a sufficiently large negative conductance. A magneto-striction oscillator will oscillate if a negative conductance of sufficient magnitude is connected to a coil of wire wrapped around the rod. A somewhat similar oscillation also, occurs when a telephone receiver or a loudspeaker is connected to a negative conductance.

Now, I have discovered an improved method of, and devised means for, producing a negative resistance characteristic between a pair of terminals. The advantage of the system herein described over previous systems for the same purpose resides in the fact that the negative resistance characteristic holds good down to the lowest frequencies, even including zero frequency, or direct current effects, and, also, the value of the negative conductance (the term "negative conductance" is preferred to the term of "negative resistance") may be readily controlled and adjusted to any value from large positive values to large negative values.

Thus, one of the main objects of the invention is to provide a circuit having a negative conductance characteristic which is independent of frequency for medium and low frequencies, and, furthermore, such that the negative conductance appears between a pair of terminals so located, that it is not necessary for any direct current to flow through the utilization means connected to these terminals.

Another important object of the invention is to provide in combination two, or more, electron discharge devices connected to operate as relays, in cascade, with the output of one tube connected to the input of a preceding tube whereby the anode circuit of the latter tube presents a negative inductance as indicated by means inserted in the external anode circuit.

Another object of the invention is to provide a symmetrical circuit presenting negative conductance between a pair of terminals so arranged that no steady component of current flows through a utilization means, which means is adapted for oscillating operation, connected to said terminals.

Still other objects of the invention are to improve generally the simplicity and efficiency of negative conductance circuits, and to particularly provide a circuit of this nature which is not only reliable in operation, but economically manufactured and assembled.

The novel features which I believe to be characteristic of my invention are set forth in particularity in the appended claims, the invention itself, however, as to both its organization and method of operation will best be understood by reference to the following description taken in connection with the drawing in which I have indicated diagrammatically several circuit organizations whereby my invention may be carried into effect.

Figure 1A:
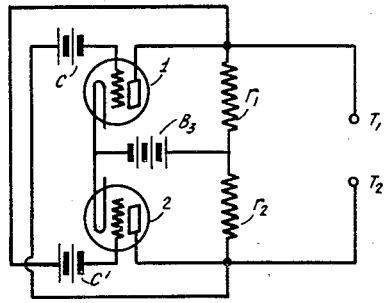
Figure 2:
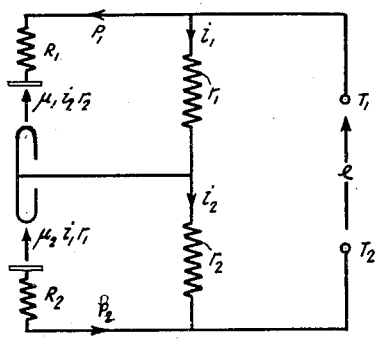
Figure 3:
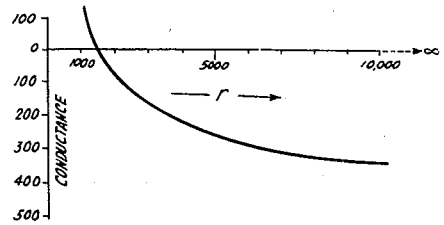
Figure 5:
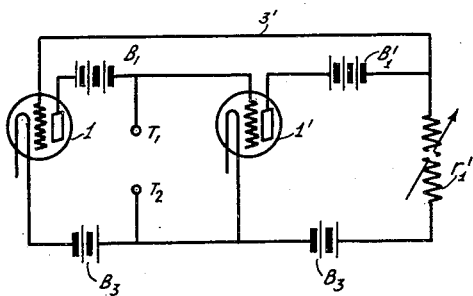
Figure 4:
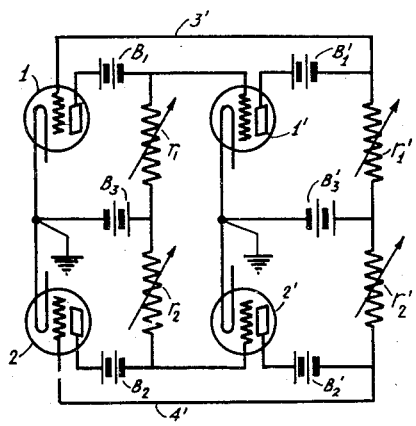

In the drawing,

Fig. 1 diagrammatically shows a circuit embodying the invention,

Fig. 1a is a modified form of the invention,

Fig. 2 graphically represents an electrical analysis of the invention,

Fig. 3 graphically shows a study of the operation of the circuit embodying the invention, Fig. 4 shows a modified form of the invention, Fig. 5 shows a modified form of the invention derived from Fig. 4.

Referring to the accompanying drawing in which like characters of reference indicate the same parts in the different figures, Fig. 1 shows an arrangement which has been found by experiment to achieve the objects enumerated heretofore. The circuit employed specifically comprises a pair of electron discharge devices 1 and 2, the anode of the device 1 being connected in series with the anode of the device 2 through a series connection. The latter includes a source of direct current $B_1$, a resistor $r_1$, a second resistor $r_2$, and a second source of direct current $B_2$. The cathodes of both devices 1 and 2 are connected in common, through a third source of direct current $B_3$, to both resistors $r_1$ and $r_2$.

The anode of the device 1 is connected by a lead 3 to the control electrode of the device 2, while the anode of the device 2 is connected by a lead 4 to the control electrode of the device 1. A variable resistance R is connected in shunt with the resistors $r_1$, $r_2$, and is provided for the purpose of adjusting the total conductance to the desired value. The terminals $T_1$ and $T_2$ are connected across the variable resistance R, and left open to receive any device which is to be subjected to the effect of negative conductance, thereby effectively connecting such a device in shunt with the variable resistance R.

In Fig. 1a there is shown a circuit slightly modified in that an arrangement for sources of direct current is used which causes less capacity effect, this being secured by employing physically small sources C and C' for the control electrodes of the tubes 1 and 2. In this modification only the source $B_3$ is employed, and the sources $B_1$ and $B_2$ not used. As a matter of fact, the source $B_3$ is only necessary in case the arrangement otherwise produces too much negative bias on the control electrodes. It is, also, to be pointed out that the conductance of the circuit might, if preferred, be adjusted by making the resistors $r_1$ and $r_2$ adjustable.

In Fig. 2 there is shown the circuit of Fig. 1 redrawn for analytical purposes. A voltage $e$ is assumed to be impressed between the terminals $T_1$ and $T_2$. With the symbols as shown in Fig. 2, the following relations can easily be shown to exist in the circuit:

$$i_1 + P_1 = i_2 + P_2$$
$$e = i_1 r_1 + i_2 r_2$$
$$-\mu_1 i_2 r_2 + i_1 r_1 - P_1 R_1 = 0$$
$$i_2 r_2 - P_2 R_2 - \mu_2 i_1 r_1 = 0$$

and $$\frac{i_1 + P_1}{e} = \text{conductance}$$

The current may be calculated by well known means, and the amount of this current per volt of $e$, that is the conductance between the terminals $T_1$ and $T_2$, is further to be given by the expression:

$$\frac{R_1 R_2 + R_1 r_2 + r_1 R_2 + r_1 r_2 - \mu_1 \mu_2 r_1 r_2}{r_1 r_2 (R_1 \mu_2 + R_2 \mu_1) + r_1 r_2 (R_1 + R_2) + R_1 R_2 (r_1 + r_2)} \quad (1)$$

If the circuit is symmetrical the above expression becomes simply $$\frac{(r+R)^2 - (\mu r)^2}{R + r(\mu + 1)} \times \frac{1}{2rR} \quad (2)$$

In Fig. 3 there is graphically shown the operation of a circuit, as exemplified in Fig. 1, wherein the relation shown in Formula 2 is plotted against values of $r$ varying from 1000 ohms up to infinity. In the calculations R was assumed to be 10,000 ohms and $\mu$ was taken as 8. It is obvious that not much is gained by making $r$ greater than 5000 ohms. In fact, I have found that increasing $r$ too much actually decreases the conductance in practice, because of the introduction of a large phase shift in the voltages fed back. The electron discharge devices 1 and 2 may be of the separately heated cathode type, and need not be of similar characteristics, in fact, screen grid tubes or any other suitable type may be employed.

In Fig. 1a there have been shown biasing grid sources, but these can be omitted and bias obtained from voltage drops produced by filament, by cathode, or anode, current flowing through resistors in well known manner. When this arrangement is used at very high frequencies, it is advisable for best results to shunt distributed capacities (not shown) with inductances of reactance equal to the reactance of capacity shunted. This substantially eliminates the shunting effect of the capacity.

It will, thus, be seen that there has been provided in Figs. 1 and 1a a symmetrical circuit presenting negative conductance between a pair of terminals which terminals are so arranged that no steady component of current flows through a utilization means, which means is adapted for oscillatory operation, connected to said terminals. Such utilization means may be for example a piezo-electric crystal oscillator connected directly between terminals $T_1$ and $T_2$. In this connection, it is pointed out that in prior art arrangements producing negative conductance, such a crystal could not be connected between the utilization terminals without there being provided an additional path in shunt to the crystal to permit of passage of the direct current. Due to the symmetry of the arrangement, the cathode may be grounded, and, then, if a symmetrical electrical tuned circuit is connected between the terminals $T_1$ and $T_2$, the system is perfectly "astatic".

The utilization terminals may be also connected to any of the devices mentioned heretofore such as a tuned circuit adapted for oscillation, in an electric motor, a magneto-striction oscillator, or used in any electric circuit to reduce its resistance. It will be obvious that many other uses will readily occur to those skilled in the art.

If a greater negative conductance is required than available from the arrangement of Fig. 1, more amplification can be added, the connections back to the first grids being, however, reversed if an odd number of stages is added. Fig. 4 shows a single stage added to Fig. 1, the grids of tubes 1 and 2 being connected by leads 3' and 4' respectively to the anodes of tubes 1' and 2'. The connections are otherwise the same in each stage, corresponding elements in each stage being similarly referred to. Either of the symmetrical pairs of grids may be utilized as the negative conductance terminals.

Although all resistances have been shown variable, one pair, preferably those lying between the pair of grids chosen as output terminals, may be fixed at a value sufficient to allow the desired value of negative conductance to be attained without requiring inconveniently high values of the other resistors. Battery voltages are chosen to make the tubes operate efficiently as amplifiers, such choice being well understood in the art. If two resistors are fixed as suggested above, and each is made equal to R, the negative conductance is $$\tfrac{1}{2}\left[\frac{1}{R}\left(1 - \frac{\mu^2 r}{R+r}\right) + \frac{1}{R}\right].$$

This assumes all tubes alike, having plate circuit resistance R and amplification constant $\mu$, and that the variable resistances are each equal to $r$.

In cases where symmetry is not required the upper half of Fig. 4 may be used, the terminals being taken as the terminals of either resistance. Furthermore, if these terminals are to be connected to a conductive load the resistor between these terminals may be omitted entirely. Negative conductance in this case is $$\frac{1}{R}\left(1-\frac{\mu^2 r}{R+r}\right).$$

Further, while I have indicated and described several arrangements for carrying my invention into effect, it will be apparent to one skilled in the art that my invention is by no means limited to the particular organizations shown and described, but that many modifications may be made without departing from the scope of my invention as set forth in the appended claims.

What I claim is:

1. A circuit adapted to provide an adjustable negative conductance independent of frequency between a pair of terminals which comprises, a pair of electron discharge devices each thereof having anode, cathode and grid electrodes, means for maintaining the anode of each tube at a predetermined potential with respect to its respective cathode, a conductive connection including a source of current between the anode of one tube and the grid of the other and a similar connection between the anode of the second tube and the grid of the first whereby the grid of each of said devices has a potential applied thereto related in a predetermined manner to the anode potential of the other device, a circuit including a pair of impedances for connecting the anode of one device to the anode of the other, a circuit including said anode potential means between a point intermediate said impedances and both said cathodes, said pair of terminals being connected to the anodes of the two devices whereby the application of direct current voltage between said terminals results in a direct current flow in said system proportional to the voltage applied but in the opposite direction to the flow of current which would normally be caused by the application of said direct current voltage.

2. A circuit adapted to provide an adjustable negative conductance independent of frequency between a pair of terminals which comprises a pair of electron discharge devices each thereof having anode, cathode and grid electrodes, means for maintaining the anode of each device at a predetermined potential with respect to its cathode, a conductive connection from one grid of one of the devices to the anode of the other and a similar connection between one grid of the said other device and the anode of the first-mentioned device, means for biasing said grids with respect to their respective cathodes, a circuit including a pair of impedances for connecting the anode of one of the devices to the anode of the other, a pair of terminals connected to corresponding points in the anode circuits of the two tubes, and means for varying the negative conductance comprising a variable impedance device shunted across said two terminals, the arrangement being such that a load connected across the two terminals need not be conducting and still have the negative resistance independent of frequency.

3. A negative impedance and amplifying arrangement comprising a first pair of electronic tubes including anode, cathode and control grid electrodes, means for connecting the control grids of said tubes comprising a pair of symmetrically arranged series impedances, a second pair of tubes including anode, cathode and control grids, a second pair of symmetrically arranged series impedances for connecting the control grids of the second pair of tubes, means for connecting the anodes of said second pair of tubes including said first two series impedances, a common connection between the cathodes of the first pair of tubes and a point intermediate the first pair of impedances including a source of current, a common connection between the cathodes of the second pair of tubes and a point intermediate the second pair of impedances including a source of current and means for connecting the anodes of said first pair of tubes including the second two series impedances.

4. A circuit adapted to provide an adjustable negative conductance independent of frequency between a pair of terminals comprising, a pair of electronic devices each thereof having anode, cathode and grid electrodes, a conductive connection between the anode of one of said devices and the control grid of the other including a source of direct current, a connection between the anode of the second device and the grid of the first including a source of direct current, a connection between the negative ends of each of said sources including a pair of symmetrically arranged impedances, a connection common to both cathodes and a source of current connected between said common connection and a point intermediate said two impedances, a variable resistor device shunted across said series impedances and a pair of terminals for connecting any suitable utilizing device across said variable resistor.

WALTER VAN B. ROBERTS.